INVENTOR.
JOHANNES KRAMER

United States Patent Office 2,973,433
Patented Feb. 28, 1961

2,973,433
METHOD AND DEVICE FOR ADJUSTING THE EXCITATION OF A STIGMATOR IN ELECTRON-MICROSCOPES

Johannes Kramer, Delft, Netherlands, assignor to North American Philips Company, Inc., New York, N.Y., a corporation of Delaware Filed Nov. 25, 1957, Ser. No. 698,702

Claims priority, application Netherlands Jan. 3, 1957

3 Claims. (Cl. 250—49.5)

The present invention relates to a method of adjusting in electron-microscopes the intensity and the geometry of the astigmatism-correcting field of a stigmator. It also relates to devices for carrying out such methods.

A stigmator is a device for correcting astigmatism in an electron beam of an electron microscope.

In electron-microscopes, it is known (see, for example, U.S. Patent 2,547,994, or German Patents 942,518 and 950,312) to provide one or more groups of electrodes or magnetic poles arranged about a central axis, which electrodes or poles yield the desired auxiliary field upon excitation. Each of these groups comprises four elements, each two elements arranged opposite one another having the same electric or magnetic polarity. The geometry of the field generated by such a unitary four-pole system corresponds to that of an electron-optical cylinder lens. By altering the pole strength, the refractive power of the lens is varied. In order to modify the astigmatism caused by this lens, the four-pole system should be arranged for rotation about the central axis or another four-pole system should be added, the poles of which are arranged between those of the other system. The combined fields may produce artificial astigmatism which can be regulated in value and sense by adjusting the excitation.

A stigmator enables errors of rotational symmetry of an electron-lens in electron-microscopes to be almost completely corrected when managing to secure the optimum adjustment of the correcting field. For this purpose it is necessary to determine, from the disfigurement of the image produced on the fluorescent screen of the microscope, the sense of the astigmatism, while removal of the disfigurement should be made visible. However, the low brightness of the image makes it difficult accurately to judge the result of the correction.

With the desired magnification the luminosity of the image is too low for visual perception. In order to increase its brightness the magnification is reduced but then the details of the image are too small for perception with the naked eye. Therefore, a suitable optically magnifying device is used.

In order to control the adjustment of the stigmator, it is known to diminish the excitation of the projection lens. If, as a result thereof, no visible disfigurement of the image details occurs, the stigmator adjustment is assumed to be correct, but even then it is all but certain whether the result obtained is actually the optimum result.

The present invention has for its object to permit adjustment of the correcting astigmatism produced by a stigmator in such manner that the disadvantage of reduced visual sensitivity to low luminous intensities is avoided. The method for adjusting an auxiliary field in an electron-microscope, to which the invention relates, may be used for controlling the excitation of one or more groups of electrodes or magnetic auxiliary poles arranged about the axis of the beam of rays and is characterized in that two adjusting values of excitation are successively chosen for each individual group, so that the images projected on to the screen exhibiting disfigurements of like visibility in both cases, and subsequent thereto that adjustment is chosen which is equally different from one and from the other value.

A phenomenon known per se is that the organs of sight are more sensitive to comparing than to absolute observation. This phenomenon is used to advantage by the invention with a view to increasing the resolving power of an electron-microscope.

The excitation values required for each group of electrodes or auxiliary poles may be separately adjustable, but are also obtainable in the case of fixed adjustment if provision is made of separate intensity-control for securing equal visibility. A device suitable for separate adjustment of the excitation may comprise a bridge circuit of resistors inserted in the supply circuit of the stigmator, one arm of whch comprises two fixed resistors whose junction point is connected to an electric conductor to the stigmator, while its other arm comprises a potentiometer, the sliding contact of which is connected to the other electric conductor of the stigmator. Alternatively, the two fixed resistors may each comprise a tapping having equal and opposite potentials with regard to the junction point so that, upon commutation of the supply conductor to either of these contact points, the excitation varies by the same amount in opposite sense.

In order that the invention may be readily carried into effect, examples will now be described in detail with reference to the accompanying drawing, in which.

Figure 6:
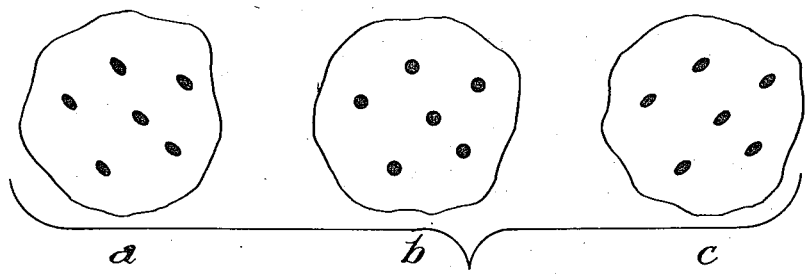

Figures 6a, b and c show disfigurements of a grain coating under tests due to astigmatism.

Astigmatism-correction by means of a four-pole system, one of the correction axes of which co-concides with the sense in which the image is disfigured by astigmatism, may be effected by controlling the pole strength. In order to control the correction it is advisable to project on to the fluorescent screen in the microscope an image of simple structure such as obtained when projecting a granular object, for example a metal-grain coating on a foil of a substantially non-electron-absorbing material. Disfigurement occasioned by astigmatism can easily be discerned (see Figs. 6a, b and c) if the image is not accurately focused on the screen and preferably the image plane is at a slightly greater distance from the electron-optical means than the distance at which the fluorescent screen is actually spaced therefrom. Along the edges, the images of the grains exhibit a shadow seam which, in the absence of astigmatism, is equidistant from the edge throughout. In an astigmatic image this seam has a width varying along its periphery. Correction of an astigmatism-involving electron-optical device is obtained if, by excitation of the stigmator, the shadow seam extends again evenly along the edge.

Figure 1:
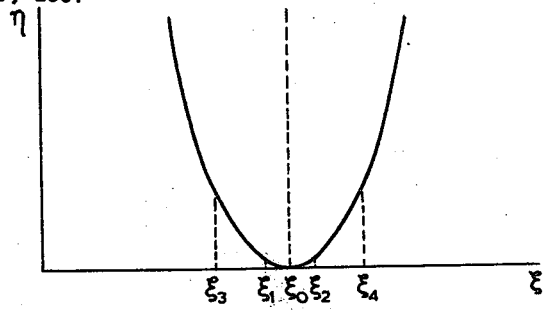
Figures 1 and 2 show graphs.

Variations of the resulting astigmatism by excitation-variation of the stigmator are readily visible in the case of rather considerable disfigurements, but the perceptibility decreases if the disfigurement is lesser. Fig. 1 shows a curve indicating the relationship existing between the visibility of the disfigurement $\nu$(nu) and the astigmatism $\xi$(xi), whence it appears that, if the desired adjustment of the stigmator be $\xi_0$, the visibility of the disfigurement has greatly decreased in this range. This causes troublesome inaccuracy between values of the adjustments at which the resulting astigmatism varies from $\xi_1$ and $\xi_2$.

Figure 2:
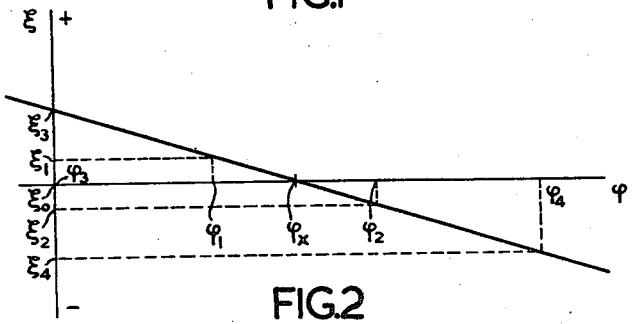

The same area is indicated between $\varphi_1$ and $\varphi_2$ in Fig. 2, in which the astimgatism is indicated as a function of the adjustment $\varphi$(phi) of the stigmator. In accordance with the polarity of the poles arranged opposite one another, or the sense of the magnetic field in the stigmator, there is positive and negative astigmatism, the directions of which subtend a right angle in the case of a four-pole system. In the present example, the range of the adjustments bounded by $\xi_1$ and $\xi_2$ cannot be controlled with the required accuracy.

According to the invention, two adjustments $\xi_3$ and $\xi_4$ of the astigmatism are chosen, at which a clearly visible uneven shadow occurs at the periphery of the images of the grains, and the adjustment is such that the degree of disfigurement is the same on passing over from one to the other adjustment. If the excitation is subsequently adjusted to the value differing as much from $\xi_3$, as from $\xi_4$ the correct adjustment $\xi_0$ has been found.

According to Fig. 2, these values lead to the adjustments $\varphi_3$ and $\varphi_4$ of the excitation of the stigmator. From Fig. 2 it is seen that the corrected electron-optical device exhibits astigmatism which has completely been removed by the adjustment $\varphi_x$.

Figure 3:
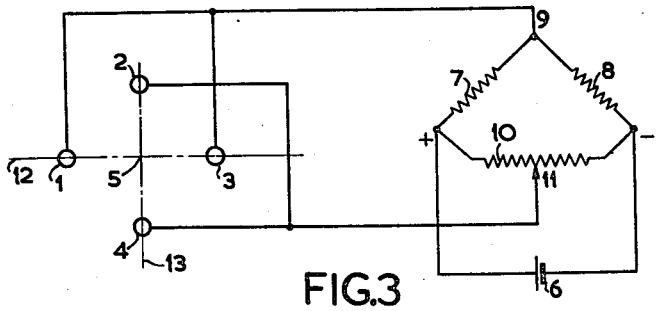
Figures 3 and 4 represent two forms of control devices according to the invention.

In the embodiment shown in Fig. 3, a four-pole stigmator is shown diagrammatically, the poles 1, 2, 3 and 4 of which are symmetrically arranged about the axis 5 of the beam, which axis is assumed to extend, at right angles to the plane of the drawing.

Connected to the supply 6 is a bridge circuit made up of resistors 7 and 8, the junction point of which is denoted by 9, and of a potentiometer 10. The junction point 9 is connected to the poles 1, 3, while the sliding contact 11 of the potentiometer 10 is connected to the poles 2 and 4. The sliding contact 11 may be adjusted so that the potentials of all the poles are alike.

Alternatively, the fixed resistors 7, 8 may jointly constitute a potentiometer, the point 9 of which constitutes the sliding contact. In this case, the potentials of both opposed pole pairs are variable, which increases the effect of the stigmator but is, in fact not different from the form shown in the drawing, in which the potential of two opposed poles remains unchanged and only the potential of the other two opposed poles can be regulated between positive and negative.

Instead of being connected to the two pole pairs, the supply conductors may connect the points 9, 11 to an exciter winding for magnetic poles 1 to 4, the parts of the winding for each pole being connected in series and the sense of winding being such that by the same current the magnetic field in the poles 1 and 3 is directed from front to back and is conversely directed in the poles 2 and 4.

By rotating the four-pole system about the axis of the beam, one of the lines 12, 13 connecting two opposed poles is set in the direction of the astigmatism involved by the electron-optical means. Subsequent to this, the sliding contact is shifted until a clearly visible astigmatism occurs which, for example, causes a disfigurement exceeding that of the disfigurement to be corrected. Subsequently, the sliding contact is shifted in opposite sense until a like disfigurement occurs in a sense at right angles to that occasioned by the initial astigmatism, if desired strengthened in the first-mentioned adjustment, followed by choosing the adjustment between these two deflections. If the senses of the disfigurements produced artificially do not extend at right angles to each other, the position of the four-pole corrector has to be slightly modified.

The four-pole system need not be mechanically rotatable when using two such systems. When proceeding similarly as in the foregoing, and first adjusting the excitation of one system to the correct value, the sense of the astigmatism occasioned by the electron-optical means need not be considered. The directions in which the artificial disfigurement of the image occurs, are then no longer at right angles to one another. As a result of the correction by one four-pole system a slight disfigurement occurs, the sense of which co-incides with one of the lines connecting opposed poles of this system. For feeding the second system a corresponding bridge circuit is used and the resulting astigmatism disappears on tracing, in the aforesaid manner, the optimum adjustment of the excitation for this system. If, upon excitation of the second system for obtaining artificial astigmatism, the senses in which disfigurement occurs are not at right angles to one another, the correction of the first system is not exactly correct.

Figure 4:
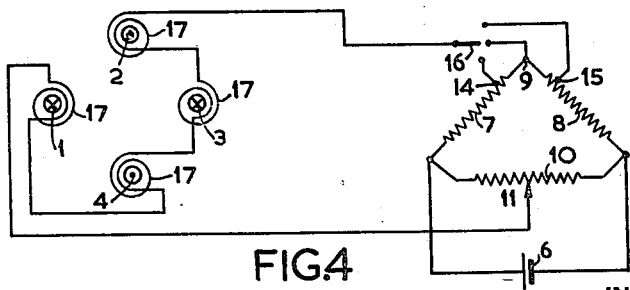

A slightly incorrect result is not completely avoidable if the location alternately to be assumed by the sliding contact 11 of the potentiometer 10 has to be estimated. The circuit arrangement shown in Fig. 4 does not suffer from this limitation. In this figure, corresponding parts have the same reference numerals as in Fig. 3. The poles 1 to 4 comprise series-connected exciter windings 17. On each side of the fixed connection 9, the resistors 7 and 8 are provided with tappings 14 and 15 respectively so that like disfigurements of the image occur when connecting the supply conductor to either of the points 14 and 15. By providing a commutator 16 alternately connecting said conductor to points 14 and 15, the disfigurement variation of the image due to shifting the sliding contact 11 is controllable. If the disfigurements are equally visible in both positions the regulator 11 has been correctly adjusted and the commutator may be connected to the junction point 9.

Figure 5:
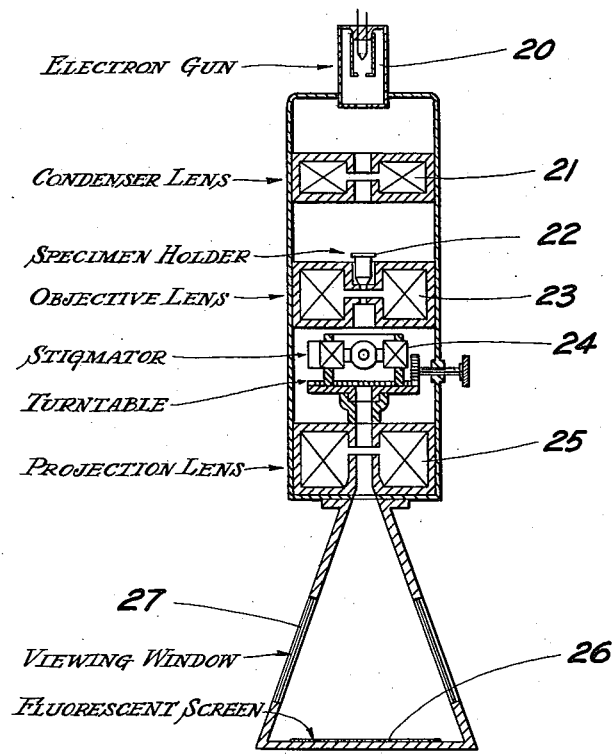
Figure 5 shows an electron microscope employing a stigmator.

For the sake of completeness, Fig. 5 shows an electron microscope employing a stigmator. The electron microscope comprises an electron gun 20, a condenser lens 21, which focuses the electron beam on a specimen supported by a specimen holder 22. The electron beam, after passing through the specimen, is focused by objective lens 23. Astigmatism introduced into the electron beam by the objective lens is corrected by the stigmator 24. The image of the specimen is magnified by projection lens 25 and projected onto a fluorescent screen 26 where it produces a visible image which can be viewed through window 27.

While the invention has been described in connection with specific embodiments, other modifications will be readily apparent to those skilled in the art without departing from the spirit and scope of the invention as defined in the appended claims.

What is claimed is:

1. A device for correcting astigmatism in an electron beam passing through an electron lens system of an electron microscope comprising in combination, an astigmatism-correcting element in the path of the electron beam and including four series-connected electrically-excited field-producing members, three series-connected variable impedance elements, means to connect one terminal of said astigmatism-correcting element to one of said variable impedance elements, means to selectively connect the other terminal of said astigmatism-correcting element to one of the other impedance elements and to the junction of said latter impedance elements, and means to apply a potential between the junctions of said latter impedance elements and said first mentioned impedance element to thereby form an electrical bridge network for energizing the astigmatism correcting element to correct astigmatism in the electron beam.

2. A device as claimed in claim 1 in which the four field-producing members are rotatable about the axis of the electron beam.

3. A device as claimed in claim 1 in which the arms of the bridge are provided with adjustable taps two of which are selectively connected to the one terminal of the field-producing members which are connected in series and the other terminal is connected to a variable tap on a third arm of the bridge.

References Cited in the file of this patent

UNITED STATES PATENTS

| | | |
|---|---|---|
| 2,547,994 | Bertein | Apr. 10, 1951 |
| 2,802,111 | Reisner | Aug. 6, 1957 |

FOREIGN PATENTS

| | | |
|---|---|---|
| 897,226 | France | May 22, 1944 |
| 723,772 | Great Britain | Feb. 9, 1955 |
| 1,104,223 | France | June 8, 1955 |